(12) United States Patent
Mieney

(10) Patent No.: US 6,481,641 B1
(45) Date of Patent: Nov. 19, 2002

(54) FUEL INJECTOR ASSEMBLY HAVING A HEAT EXCHANGER FOR FUEL PREHEATING

(75) Inventor: Harry R. Mieney, Byron, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/024,151

(22) Filed: Dec. 18, 2001

(51) Int. Cl.⁷ .................................................. B05B 1/24
(52) U.S. Cl. ........................ 239/139; 239/128; 239/132; 239/132.1; 239/585.1; 239/135
(58) Field of Search ................................. 239/128, 130, 239/132, 132.1, 133, 135, 139, 533.2, 533.3, 533.9, 533.11, 533.12, 585.1, 585.2, 585.3, 585.4, 585.5

(56) References Cited

U.S. PATENT DOCUMENTS 4,351,480 A  9/1982  Masaki et al.
5,915,626 A  6/1999  Awarzamani et al.

*Primary Examiner*—Robin O. Evans
(74) *Attorney, Agent, or Firm*—Vincent A. Cichosz

(57) ABSTRACT

A fuel injector assembly incorporating a heat exchanger and a fuel injector and being disposable in a bore in a mounting substrate such as an internal combustion engine or a hydrocarbon fuel reformer. The exchanger includes an outer wall in direct contact with the bore and also surrounds and supports the dispensing portion of the fuel injector, forming an annular plenum space therebetween. The heat exchanger has an inlet port and an outlet port communicating with the plenum space. The exchanger outlet port is connected to an inlet port of the fuel injector, such that fuel entering the fuel injector is preheated by passing first through the heat exchanger. In some applications, it may be desirable to maintain the fuel at a high pressure to prevent premature vaporization of the fuel in the exchanger and resulting vapor lock of the fuel system.

11 Claims, 2 Drawing Sheets

FUEL INJECTOR ASSEMBLY HAVING A HEAT EXCHANGER FOR FUEL PREHEATING

TECHNICAL FIELD

The present invention relates to fuel injectors for injecting liquid fuel into internal combustion engines or fuel reformers; more particularly, to such fuel injectors having heat exchanging means whereby coolant may be circulated through the exchanging means to cool the fuel injector; and most particularly, to a fuel injector having an integral heat-exchanging jacket connected to the inlet port of the fuel injector for cooling the fuel injector and heating the incoming fuel. The invention is especially useful in preheating fuel being supplied to high-temperature fuel cell reformers.

BACKGROUND OF THE INVENTION

Fuel injectors are well known for supplying metered amounts of fuel to combustors, such as internal combustion engine cylinders, and reformers, such as hydrogen/reformate generators for fuel cells.

Two problems with such use are also well known in the art. First, fuel injectors are required to operate in a relatively high-temperature environment, wherein the output force and working life of a solenoid actuator may be significantly reduced for known reasons. The solenoid is vulnerable to heat transmitted and radiated from the combustor or reformer, as well as to its own resistance-generated heat. Second, fuel supplied to the combustor or reformer is preferably vaporized before being reacted. In engines, an increase in fuel temperature typically is provided by adiabatic compression of the charge. In reformers, no comparable mechanical heat source is available.

U.S. Pat. No. 4,351,480, issued Sep. 28, 1982 to Masaki et al., discloses a specially-configured fuel injector for an internal combustion engine wherein the fuel path within the injector includes an inlet, a manifold portion including the metering apparatus of the injector, and an outlet. Fuel is circulated continuously through the injector to both cool the injector and heat the fuel. A disadvantage of this invention is that only a portion of the heated fuel is used immediately and a return path to a fuel storage tank or other reservoir means for the fuel is required. A further disadvantage is that the invention requires a complete redesign of the fuel injector and cannot be used with a prior art fuel injector.

U.S. Pat. No. 5,915,626, issued Jun. 29, 1999 to Awarzamani et al., discloses a fuel injector for an internal combustion engine wherein the solenoid coil is wound on a thin-wall sleeve thermally coupled to the fuel path through the injector, whereby resistance heat is abstracted from the solenoid by the passage of fuel through the injector. The effectiveness of this invention is limited by the relatively small heat-exchanging surface of the sleeve. Further, this invention does not address directly the significant problem of solenoid heating from contact of the injector with the combustor or reformer. For fuel injectors used with high-temperature reformers, this is the predominant source of heat.

What is needed is a fuel injector heat exchanger means wherein a heat exchanger having a relatively large exchanging surface is disposed directly between the primary heating source (the combustor or reformer) and the fuel injector, and in the fuel flow path between a fuel source and the fuel inlet to the fuel injector.

It is a principal object of the invention to provide a fuel injector assembly wherein the operating temperature of the fuel injector is decreased and the temperature of the injected fuel is increased.

It is a further object of the invention to provide an improved fuel injector assembly having jacket means disposed between the injector means of the fuel injector and the principal source of heat being conducted and radiated into the fuel injector, whereby the fuel cell is thermally insulated from such principal source of heat.

It is a still further object of the invention to provide an improved fuel injector assembly whereby injected fuel is more easily vaporized.

It is a still further object of the invention to provide an improved fuel injector assembly wherein the solenoid operates at a lower temperature.

It is a still further object of the invention to provide an improved fuel injector assembly wherein a conventional prior art fuel injector may be incorporated without significant modification.

SUMMARY OF THE INVENTION

Briefly described, the present invention is directed to a fuel injector assembly incorporating a heat-exchanger jacket, the jacket and fuel injector being disposed for use in, for example, a bore in the head of an internal combustion engine or a bore in the vaporizer of a fuel reformer. The exchanger includes an inlet port; a heat exchanging means disposable in the bore in direct contact with the head or vaporizer; the dispensing portion of the fuel injector; and an outlet port connected to the inlet port of the fuel injector, such that fuel entering the fuel injector is preheated by passage through the exchanger. In some applications, it may be desirable to maintain the fuel at a high pressure to prevent premature vaporization of the fuel in the jacket and resulting vapor lock of the fuel system.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DESCRIPTION OF THE PREFERRED EMBODIMENTS

Figure 1:
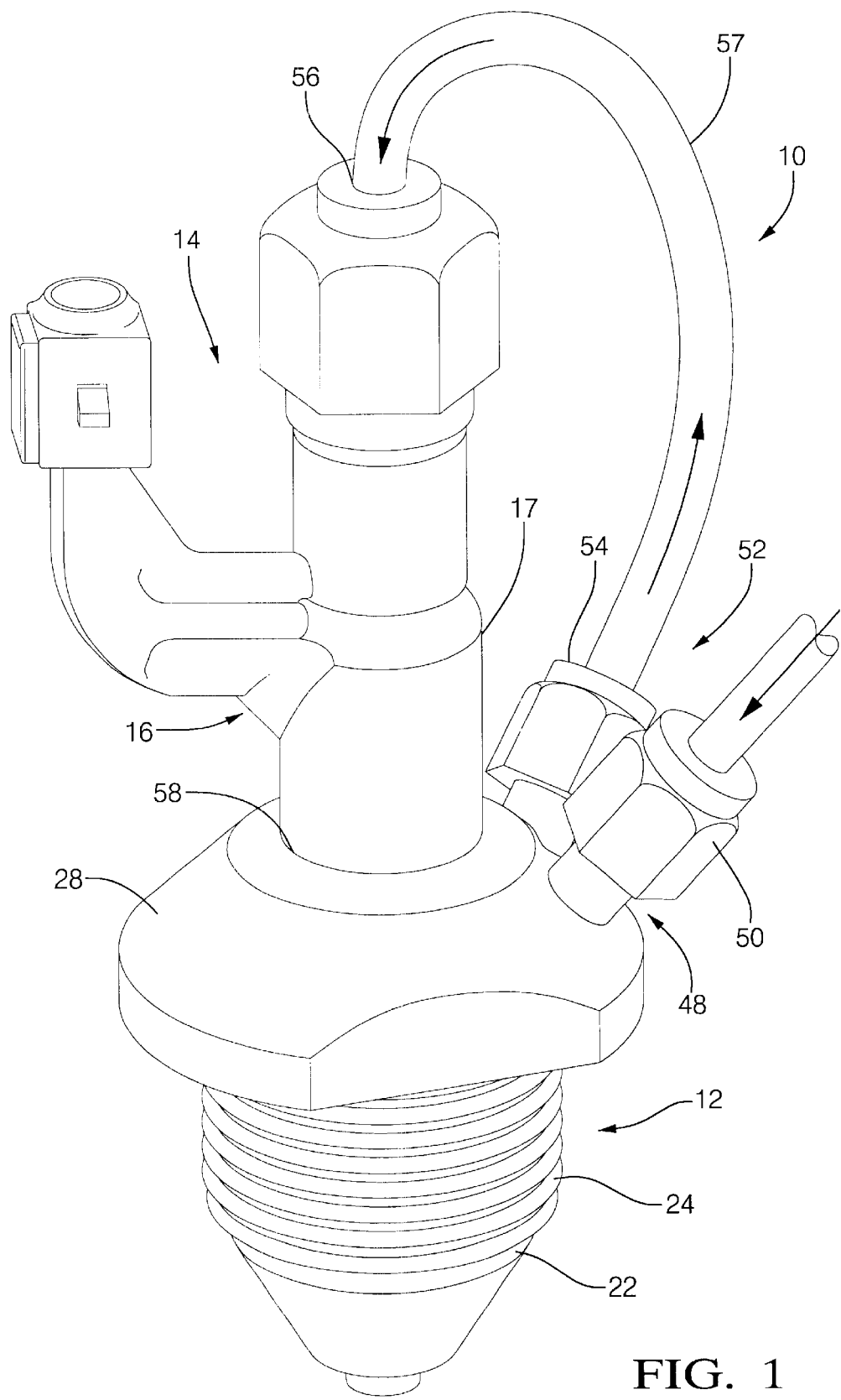
FIG. 1 is an elevational view of a fuel injector assembly comprising a heat-exchanger and a fuel injector disposed therein in accordance with the invention.
Figure 2:
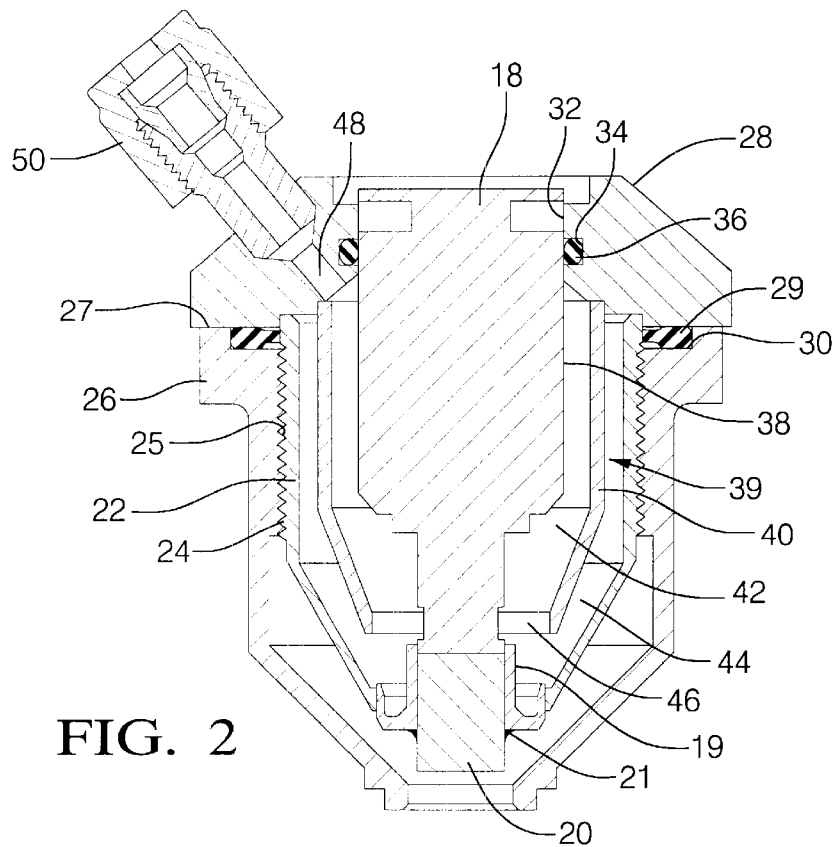
FIG. 2 is a longitudinal cross-sectional view of the jacket and dispensing portion of the fuel injector assembly shown in FIG. 1, taken along a first axial plane, showing an inlet port for the exchanger.
Figure 3:
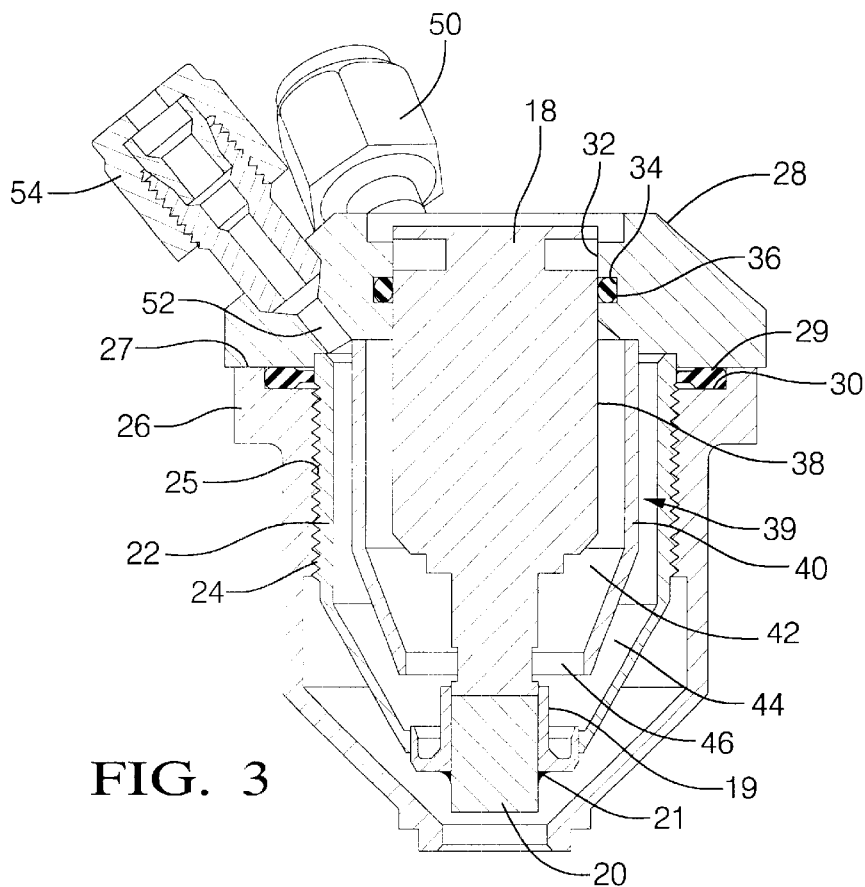
FIG. 3 is a longitudinal cross-sectional view like that shown in FIG. 2 but taken along a second axial plane, showing the outlet port for the exchanger.

Referring to FIGS. 1 through 3, a heat-exchanger jacketed fuel injector assembly 10 includes a heat exchanger 12 and a fuel injector 14 axially disposed in the heat exchanger. Injector 14 comprises generally an inlet end 16, including a solenoid actuator 17 extending from exchanger 12, and a dispensing end 18 sealingly disposed and secured within a sleeve 19 in the exchanger, as by laser welding 21 thereof, and having a dispensing tip 20 protruding from the exchanger.

It is an important advantage of an assembly in accordance with the invention that exchanger 12 may be, and preferably is, adapted to accept a conventional fuel injector without requiring significant modification thereof.

As used herein, "fuel" is to be taken to mean a hydrocarbon fuel suitable for the reactive purpose intended, such as gasoline or diesel fuel.

Exchanger 12 has a wall 22 adapted as by male threads 24 on an outer surface thereof for threadedly engaging a female-threaded bore 25 in a mounting substrate 26, such as an engine head or a reformer vaporizer. Wall 22 is preferably in direct mechanical contact with substrate 26, as shown, to maximize heat transfer from substrate 26 to the interior of the exchanger. Exchanger 12 has a flanged head 28 extending radially beyond bore 25 to limit entrance of exchanger 12 into bore 25 by contact with substrate axial surface 27 and to capture a seal ring 29 therebetween in an annular recess 30 in substrate 26. Head 28 has an axial bore 32 for receiving dispensing end 18, and an annular groove 34 containing an O-ring 36 for sealing dispensing end 18 in bore 32.

Dispensing end 18 has an outer wall 38 exposed directly to the interior of exchanger 12 and thus functions as an inner wall of the exchanger, a plenum space 39 generally being formed between exchanger wall 22 and dispensing wall 38. Preferably, exchanger 12 further comprises a generally cylindrical septum 40 extending axially from head 28 and coaxially disposed around dispensing end 18 to subdivide plenum space 39 into an inner chamber 42 and an outer chamber 44 connected via an annular passageway 46. An inlet port 48 and fitting 50 in head 28 are in communication with inner chamber 42, and an outlet port 52 and fitting 54 are in communication with outer chamber 44. Thus, when fuel is provided under pressure to inlet port 48, the fuel flows into inner chamber 42, through passageway 46, through outer chamber 44, and exits through outlet port 52. Of course, if desired, the ports may be oppositely connected and fuel flowed through the exchanger in the opposite direction. When the temperature of the fuel entering the exchanger is lower than the temperature of wall 22 or wall 38, those walls are cooled and the fuel is warmed beneficially by passage of the coolant through the heat exchanger.

The exchanger outlet port 52 is connected to injector inlet port 56 via line 57, as shown in FIG. 1, so that the fuel injector is automatically provided with preheated fuel, the heat being drawn primarily from the mounting substrate 26 by direct contact of the heat exchanger therewith.

In an alternative embodiment as shown in FIG. 1, injector 14 may be secured to exchanger 12 as by welding 58 at the outer juncture therebetween.

When a heat-exchanging fuel injector assembly in accordance with the invention is used to inject fuel into a hydrocarbon reformer, as is known in the art for generating hydrogen and reformate for fuel in a fuel cell, it may be beneficial to maintain the fuel at an elevated pressure to prevent premature vaporization of the fuel in the exchanger or the injector. Depending upon the operating temperature of the reformer, a fuel pressure of between about 10 kPa and about 5 MPa may be beneficial, and an optimal operating pressure may be determined readily without undue experimentation by one of ordinary skill in the reforming art.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. A fuel injector assembly having a heat exchanger for transferring heat from a mounting substrate and from the fuel injector to fuel flowing through the heat exchanger to cool the fuel injector and to preheat the fuel before entering an inlet port of the fuel injector, comprising:
   a) a fuel injector;
   b) a heat-exchanger jacket surrounding said fuel injector and having a wall in mechanical contact with said mounting substrate and forming a plenum space between said wall and said fuel injector;
   c) an inlet port through said jacket in communication with said plenum space for admitting fuel thereto;
   d) an outlet port through said jacket in communication with said plenum space for withdrawing fuel therefrom; and
   e) a connection between said jacket outlet port and said fuel injector inlet port for supplying heated fuel from said heat exchanger to said fuel injector.

2. A heat exchanger in accordance with claim 1 wherein said heat exchanger is disposed in a bore in said mounting substrate, and said jacket wall is in mechanical contact with a wall of said bore.

3. A heat exchanger in accordance with claim 1 further comprising a flanged head attached to said jacket wall and having an axial bore for receiving said fuel injector.

4. A heat exchanger in accordance with claim 3 wherein said inlet port and said outlet port are formed in said flanged head.

5. A heat exchanger in accordance with claim 1 further comprising a septum disposed within said plenum space for subdividing said space into and an inner chamber and an outer chamber.

6. A heat exchanger in accordance with claim 5 wherein said inner chamber is in communication with a one of said inlet and outlet ports, and said outer chamber is in communication with the other of said inlet and outlet ports.

7. A heat exchanger in accordance with claim 1 wherein said fuel injector is attached to said heat exchanger by at least one weld.

8. A heat exchanger in accordance with claim 1 wherein said mounting substrate is selected from the group consisting of an internal combustion engine and a hydrocarbon fuel reformer.

9. An internal combustion engine comprising a fuel injector assembly having a heat exchanger for transferring heat from a mounting substrate and from the fuel injector to fuel flowing through the heat exchanger to cool the fuel injector and to preheat the fuel before entering an inlet port of the fuel injector, the assembly including
   a fuel injector,
   a heat-exchanger jacket surrounding said fuel injector and having a wall in mechanical contact with said mounting substrate and forming a plenum space between said wall and said fuel injector,
   an inlet port through said jacket in communication with said plenum space for admitting fuel thereto,
   an outlet port through said jacket in communication with said plenum space for withdrawing fuel therefrom, and
   a connection between said jacket outlet port and said fuel injector inlet port for supplying heated fuel from said heat exchanger to said fuel injector.

10. A hydrocarbon reformer comprising a heat-exchanging fuel injector assembly having a heat exchanger for transferring heat from a mounting substrate and from the fuel injector to fuel flowing through the heat exchanger to cool the fuel injector and to preheat the fuel before entering an inlet port of the fuel injector, the assembly including a fuel injector, a heat-exchanger jacket surrounding said fuel injector and having a wall in mechanical contact with said mounting substrate and forming a plenum space between said wall and said fuel injector, an inlet port through said jacket in communication with said plenum space for admitting fuel thereto, an outlet port through said jacket in communication with said plenum space for withdrawing fuel therefrom, and a connection between said jacket outlet port and said fuel injector inlet port for supplying heated fuel from said heat exchanger to said fuel injector.

11. A reformer in accordance with claim 10 wherein said fuel admitted to said plenum space is pressurized to a pressure of between about 10 kPa and about 5 MPa.

* * * * *